Figure 1:
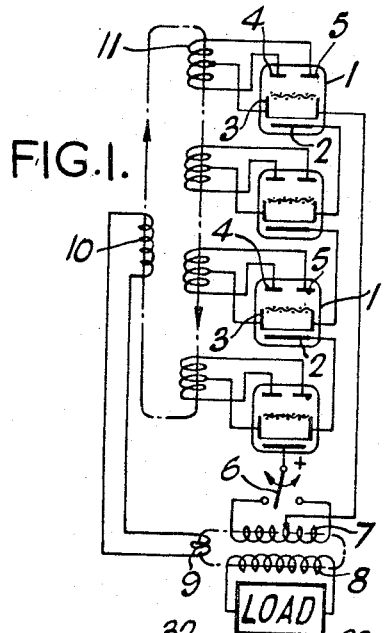

July 4, 1967 D. GABOR ETAL 3,329,885
THERMIONIC ENERGY CONVERTER
Filed Dec. 30, 1963 2 Sheets-Sheet 1

INVENTORS
D. GABOR
J. F. ENGELBERGER
BY Cameron, Kerkam & Sutton, ATTORNEYS

INVENTORS
D. GABOR
J. F. ENGELBERGER
BY Cameron, Kerkam & Sutton
ATTORNEYS

United States Patent Office 3,329,885
Patented July 4, 1967

1

3,329,885
THERMIONIC ENERGY CONVERTER
Dennis Gabor, London, England, and Joseph Frederick Engelberger, Newtown, Conn., assignors to National Research Development Corporation, London, England, a corporation of Great Britain
Filed Dec. 30, 1963, Ser. No. 334,973
Claims priority, application Great Britain, Jan. 4, 1963, 575/63
9 Claims. (Cl. 322—2)

This invention relates to the generation of electric current from heat by means of thermionic energy converters. More particularly it is concerned with arrangements designed to generate alternating current.

In particular types of thermionic energy converter the main discharge of thermionically generated current is controlled by means of ions supplied by an auxiliary discharge. An example of such a type of thermionic energy converter is disclosed in copending application Ser. No. 415,238, filed Dec. 2, 1964 as a continuation-in-part of now-abandoned application Ser. No. 87,732, filed Dec. 14, 1960. The thermionic energy converter disclosed therein has an emitter electrode and a collector electrode between which the main discharge occurs and an auxiliary anode between which and the emitter electrode the auxiliary discharge occurs. However the invention is in no way limited to the converter disclosed in the above mentioned application Ser. No. 415,238 and other thermionic energy converters having a main discharge controlled by an auxiliary discharge can equally well be used.

In application Ser. No. 415,238 the generation of alternating current is described by utilising two converters in a push-pull arrangement to pass current in successive half cycles in opposite directions through two primary windings of an output transformer. The main discharge current in each converter is interrupted in alternate half-cycles by interruption of the auxiliary current, which is caused merely by dropping the voltage between the collector of the main discharge current and the auxiliary anode below a certain minimum required for ionisation. This extinction voltage is about 9.5 volts for argon filled converters, 7 volts for argon-mercury mixtures and about 2 volts for caesium. However the above arrangement is inefficient since the emitter of the converter continues to radiate heat to the cold collector during the half-cycle in which the main current is interrupted.

It is an object of the present invention to provide a more efficient arrangement for generating alternating currents.

According to the present invention there is provided an arrangement for generating alternating current wherein one or more thermionic energy converters of the type in which a main discharge is controlled by an auxiliary discharge have their outputs switched to flow along two circuital paths in alternate sequence so as to energise an A.C. power output winding in opposite directions alternately, the switching taking place during momentary interruption of the main discharge by corresponding momentary interruption of the auxiliary discharge.

It thus follows that a thermionic converter operating in accordance with the invention continues to be utilised during both half cycles of the alternating current output. The main current through the converter is in the nature of a pulsating or periodically interrupted direct current and switching takes place during the short interval when the main current is zero and the switching or commutation device is not required of itself to interrupt the main current, this being produced by interruption of the much smaller auxiliary current.

Interruption of the auxiliary current can be obtained by applying a small proportion of the alternating output power to control the auxiliary discharge. In one form of the invention a thermionic converter is provided with a pair of auxiliary anodes energised in push-pull from a winding on the output transformer so that the auxiliary discharge is switched from one auxiliary anode to the other, with momentary interruption, at the end of each successive half-cycle. In an alternative form of the invention a thermionic converter is provided with only a single auxiliary anode energised by an unsmoothed full-wave rectified voltage derived from a circuit tuned to the frequency of the output and driven from the output transformer. The momentary reduction of the voltage applied to the auxiliary anode at the end of each half-cycle causes momentary interruption of the auxiliary discharge.

Switching can be provided by a mechanical commutator acting as a two way switch or a solid state circuit providing the equivalent switching arrangement. It is desirable that the resistance across the commutator to the "dead" terminal is as high as possible, preferably infinite, and that the resistance across the commutator to the "live" terminal is as low as possible. This insures that the heat losses in the commutator are as small as possible.

In a mechanical device employed in an embodiment of the invention practically infinite resistance to the dead terminal is achieved by operation in vacuo while the low resistance to the live terminal is realised by providing switching contact in the form of conical mating surfaces between two relatively movable switching members. These surfaces are arranged to be large and have a cone angle smaller than the angle of friction. A further feature of this embodiment is that the moving member is not pressed against the fixed member but is thrown into contact with it by an impulsive blow and released by an impulsive blow applied in the opposite direction. Bouncing of the contacts is avoided by the sticking of the small angle cones.

Figure 2:
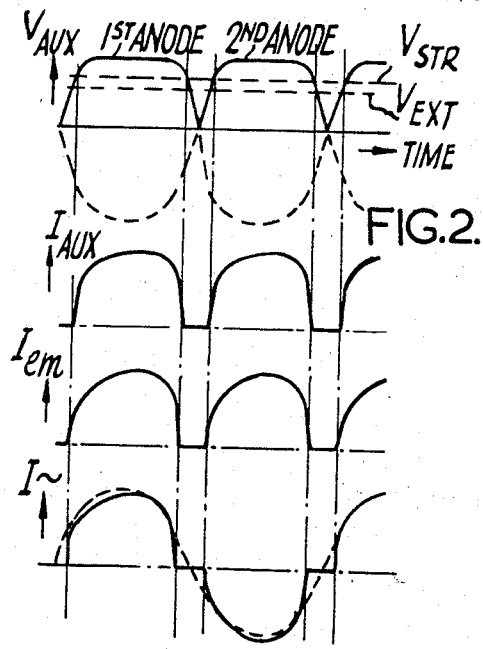
Figure 3:
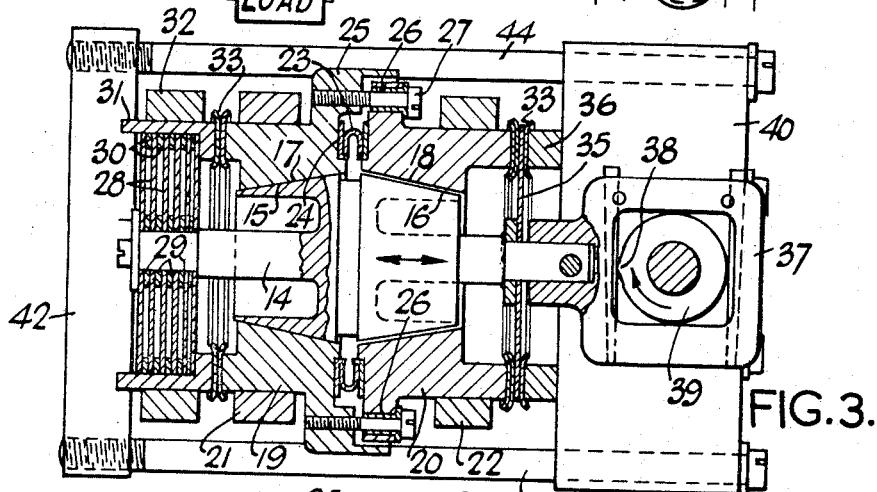
Figure 4:
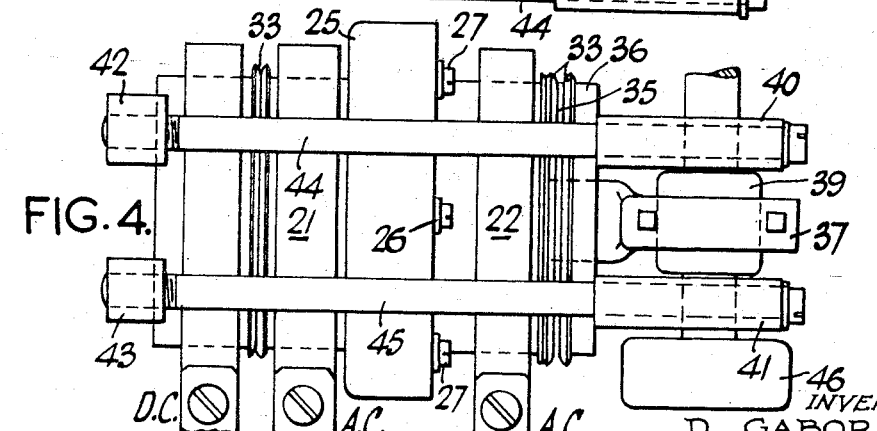
Figure 5:
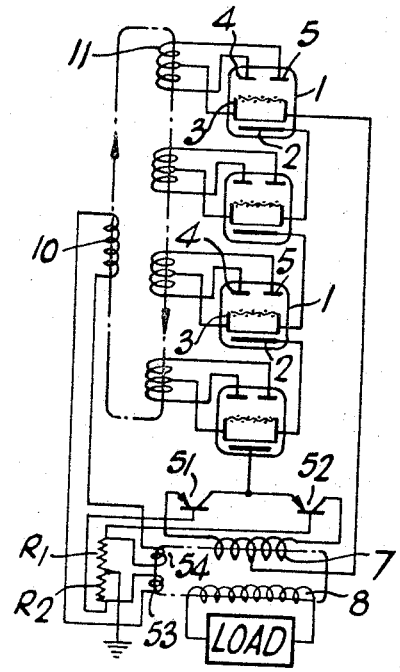
Figure 6:
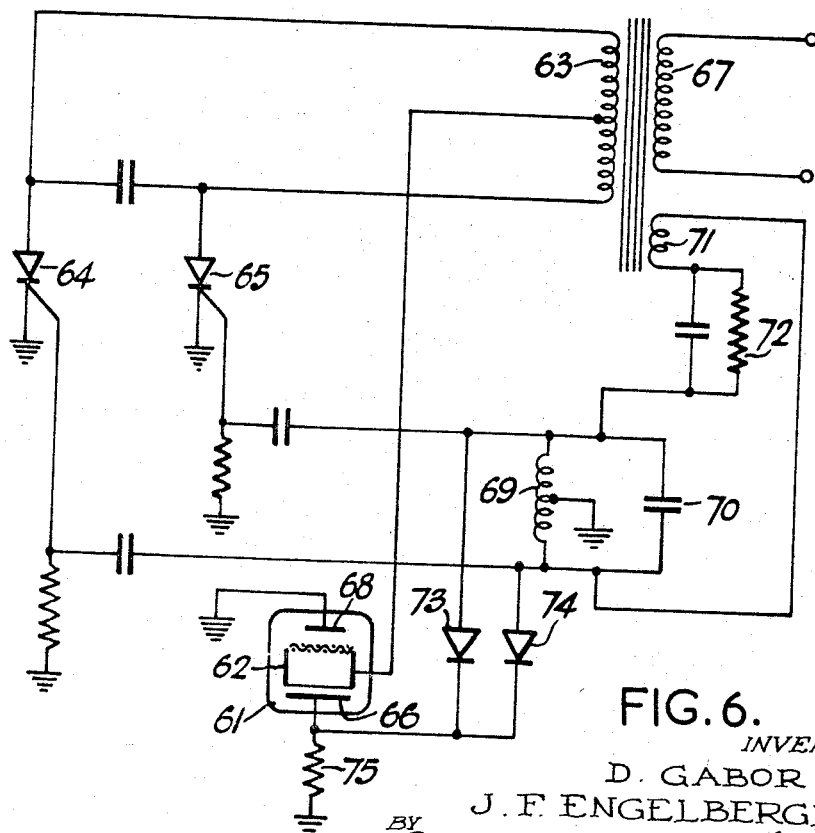

In order that the invention may be more fully understood reference will now be made to the drawings accompanying this specification in which:

FIG. 1 is a circuit diagram of a thermionic converter incorporating a mechanical switching device, FIG. 2 illustrates wave forms obtained in the operation of the circuit of FIG. 1, FIG. 3 is a section through a mechanical commutator utilised in FIG. 1, FIG. 4 is a view of the commutator illustrated in FIG. 3 at right angles to the section, FIG. 5 is a circuit diagram of a thermionic converter similar to FIG. 1 but incorporating a solid state commutator, and FIG. 6 is a circuit of an alternative embodiment of the invention also embodying a solid state commutator.

In FIG. 1 there is shown an A.C. generator having several thermionic converters 1 in series. Each converter comprises an emitter 2 which is arranged to be heated from an external source (not shown) to produce an electron stream which flows to a collector electrode 3. This main discharge is maintained by means of an auxiliary discharge to one or other of two auxiliary anodes 4 and 5 in the manner described in above mentioned application Ser. No. 415,238. Successive converters are serially connected by having the collector of each converter (except the last) connected to the emitter of the next converter and the emitter of the first converter (or alternatively the collector of the last converter) connected to a commutator 6 which makes alternate contact with one or the other half of a primary winding 79 of an output transformer the secondary winding 8 of which is connected to an external load. The centre tap of winding 7 is connected to the collector of the last converter (or alternatively to the emitter of the first converter). The output transformer is also provided with a third winding 9 which serves the auxiliary anodes through an auxiliary transformer having a primary winding 10 and a plurality of centre-tapped secondary windings 11 each associated with a different one of the thermionic converters 1. The centre tap of each secondary winding 11 is connected to the collector electrode 3 of the associated thermionic converter while the two end connections of the secondary windings are connected to the two auxiliary anodes 4 and 5.

In an alternative arrangement the primary winding 10 of the auxiliary transformer can be directly connected in series or in parallel to the load to obviate the need for a third winding 9 on the output transformer. Series connection is preferable as the auxiliary currents need to increase in proportion to the output current rather than in proportion to the output voltage.

The operation is explained in FIG. 2. The top diagram shows the auxiliary voltages $V_{aux}$. The two anodes 4 and 5 are alternatingly positive. At the moment when the positive anode exceeds the striking voltage $V_{STR}$, which is the value of voltage above which the auxiliary discharge occurs, the auxiliary discharge strikes or fires, and the current $I_{aux}$, which is the current between emitter 2 and auxiliary anode 4 or 5, as shown in the second diagram commences to flow, to be extinguished again when the voltage has dropped below the extinction voltage $V_{EXT}$ which is the voltage below which the discharge cannot be maintained. $V_{EXT}$ is somewhat less than $V_{STR}$.

The main current $I_{em}$, being the current between emitter 2 and collector 3, as shown in the third diagram, follows $I_{aux}$ in its general character; it starts and goes to zero almost simultaneously with $I_{aux}$, there will be therefore an intermittent emitter current. The last diagram shows the output current I after commutation, together with the smoothed, almost sinusoidal current which can be filtered out of it by suppressing the higher harmonics by means well known in the art. There is however, no need to operate with a sinusoidal output current. For many purposes an almost square A.C. current is acceptable, and for a given thermionic converter this operation gives the largest output and efficiency.

FIGS. 3 and 4 are representations of a preferred form of the commutator. It is understood that commutation has to take place in those intervals in which the current is zero, so that the commutator need never interrupt a current.

The commutator shown in longitudinal section in FIG. 3 has axial symmetry. A shaft 14 preferably of a hard, well conducting copper alloy vibrates axially. It carries two conical sleeves 15 and 16, preferably machined out of the same piece. These moving cones engage alternatingly with the stationary cones 17 and 18. A very small longitudinal motion, for instance 0.005"–0.010" is sufficient to establish a spacing of the order .001"–.002" between, say, 16 and 18. Such a distance in a vacuum, even if it is not a very high vacuum, is sufficient to prevent any discharge up to several hundred volts, provided that there is no current flowing at the moment of interruption.

The cones 17 and 18 are machined into metal pieces 19 and 20, preferably of an alloy with high electrical and thermal conductivity and which does not alloy easily with the material of the moving cones, for instance, beryllium copper if the moving cone is chromium copper. These two pieces 19 and 20 form parts of the vacuum mantle, and they are also the contact pieces for the leads 21 and 22 which lead to the ends of the transformer primary 7 (FIG. 1).

It is very essential that these two electrodes 19 and 20 be well insulated from one another, accurately aligned, and held in such relative positions that a very small axial movement of 14 completely disengages one pair of cones and completely engages the other. This is achieved by distancing the said pieces by means of a slightly flexible U-shaped member 23, covered with an expansion-matched insulating enamel. For increased voltage safety this is backed by one or more gaskets 24, also enamel coated.

The electrodes 19, 20, carry flanges 25, 26, which are fixed to one another by insulated pull-screws 27, and distanced by pressure screws, not shown. Accurate alignment is achieved by first tensioning all the pull-screws, so that both outer cones 17, 18 make contact with their counterparts 15, 16. When this is done the rest of the device can be assembled. One end plate of the device is the lead for the direct current to the moving shaft 14. This is made up of a number of metal discs 28, for instance of a hard well conducting copper alloy, with inner and outer spacing gaskets 29 and 30, all brazed together with one another, with the spigot of the shaft 14 and with the annulus 31, which serves as the terminal for the D.C. around which is clamped a ring 32, preferably consisting of a number of copper strips, which leads to one D.C. outlet of the converter column.

This endplate must be insulated from the A.C. electrode 19. This is achieved by one or several gaskets 33 of metal coated with a suitable enamel.

At the other end there is a similar annulus 36, which supports the other end of the vibrating shaft 14, which is similarly insulated by enamelled gaskets 33. But as this end need not conduct large currents, it carries only one flexible end plate 35.

In the manufacture the parts as described are clamped together with rings of brazing metal where metallic joints are to be made. The annular space between the flanges 25, 26 is filled up with powdered enamel glass, or with a paste thereof. The pull-screws 27 are now released by a fraction of a turn, and the push-screws turned inwards by the same amount, to move the two parts 19 and 20 relative to one another in axial direction by the required small distance of .005"–.010". The clamping by an auxiliary frame, not shown, must be elastic enough to give by this small amount, so that the adjustment of the end plates is not disturbed. The whole device is now heated in hydrogen, or in an inert gas atmosphere or in a vacuum until both the brazing material and the enamel soften and flow. Brazes and glasses, known in the art, which flow easily at first melting but once solidified cannot be easily re-melted are preferable. After cooling the whole device is solidly connected, in particular the joint between 19 and 20 is no longer flexible as it is filled with a solid ring of enamel glass. The device is now evacuated through a tubular metal tube, not shown, which is finally pinched off, leaving the inner space under vacuum.

After this operation the parts which effect the mechanical motion are mounted. A frame 37 is fixed on the spigot of the shaft 14. In operation this frame receives knocks alternatingly from the right or left by a small projection 38 on a rotating drum 39, which is driven by a synchronous motor, not shown. The fine adjustment of the stroke is effected by two wedges. It is essential for the accurate operation of this device that the recoil shall be taken up by the whole mantel-structure, hence the strong bearings 40, 41 are screwed directly on to the annulus 36. It is also essential that the glass joints shall be protected from tension which arises when the shaft 14 is thrown towards the left end, because enamel glass can stand considerable pressure but little tension. For this reason pressure bars 42, 43 are placed into notches in the end-ring 31, and are clamped solidly to the prolonged bearing plates 40, 41, by means of four screws of which two, 44 and 45, are shown. As the whole device is now solid in itself, the drive from the synchronous motor can be effected by flexible coupling, not shown. A flywheel 46 may be provided to ensure uniform rotation.

If the thermionic generating unit is part of another A.C. system, the synchronous motor is started from the mains. Care must be taken to switch on the generators only after the motor has settled down in speed and phase. This is effected by a switch in the D.C. line, or in the primary of the auxiliary transformer. If the starter of the synchronous motor is set at the correct angle, the thermionic unit will supply current in the right phase. If the unit is independent, the synchronous motor must be started up with a D.C. motor, until it is supplied with A.C. current from the thermionic unit itself. In this case a speed regulator must be provided, to keep the frequency constant.

FIG. 5 illustrates a circuit which is similar to the circuit illustrated in FIG. 1 and like parts have like reference numerals. In this circuit the mechanical commutating device 6 is now replaced by a pair of solid state gated rectifiers 51 and 52 having their emitter and collector electrodes connected between respective opposite ends of the primary winding 7 of the output transformer and the emitter of the first converter 1. Alternatively they could be connected to the collector electrode of the thermionic converter at the opposite end of the line. The primary winding 10 of the auxiliary transformer is now driven from a pair of windings 53 and 54 provided on the output transformer which are connected together through biasing resistors $R_1$ and $R_2$. The base electrodes of the gated rectifiers 51 and 52 are connected to the biasing resistors $R_1$ and $R_2$ so that the rectifiers are modulated by a voltage derived from the primary current of the output transformer. By suitable design of the transformer windings 53 and 54 and of the auxiliary transformer 10/11 the phase shift between the primary current and the auxiliary current can be made negligible so that the rectifiers 51 and 52 are biased by a voltage which is in phase with and proportional to the auxiliary current. This insures that no current will flow through the rectifiers 51 and 52 during the interval in which the auxiliary current, and thereby the main current also, are zero. The operation of the circuit is otherwise identical to FIG. 1 and waveforms are produced as in FIG. 2.

An alternative embodiment of the invention utilising silicon controlled rectifiers for commutation is illustrated in FIG. 6. In this circuit there is shown a single thermionic converter 61 the collector electrode 62 of which is connected to the centre tap of a primary winding 63 of an output transformer the two ends of which winding 63 are returned through silicon controlled rectifiers 64 and 65 and a biasing resistor 75 to the emitter 66 of the thermionic converter. Alternating current is generated in the output winding 67 of the output transformer by conduction through each silicon controlled rectifier alternately. Switching of the silicon controlled rectifiers 64 and 65 is achieved in synchronism with momentary interruption of the auxiliary discharge in the converter 61 to an auxiliary anode 68 which interruption also interrupts the main discharge current.

This dual function is achieved by means of a parallel tuned circuit consisting of an inductance 69 and capacitance 70 tuned to the desired frequency of the output and which is energised from the output transformer through an auxiliary winding 71 in series with a loading resistor 72. Opposite ends of inductance 69 are A.C. coupled to the control electrodes of each silicon controlled rectifier 64 and 65 and are also connected through individual rectifiers 73 and 74, which form a full wave rectification circuit, to the emitter of the thermionic converter. The full wave rectified voltage so obtained is applied across the biasing resistor 75 and causes the auxiliary anode 68 of the thermionic converter to vary with respect to the emitter 66 by the amount of this voltage.

Assuming the oscillatory circuit 69/70 to be oscillating at the required output frequency, then it will be seen that the full wave rectified wave form consisting of half sinusoidal pulses of the same polarity in each successive half-cycle are applied across the resistor 75 to energise auxiliary anode 68 and cause momentary extinction of the auxiliary discharge at the end of each successive half-cycle. The A.C. wave form of the tuned circuit is also applied to the silicon controlled rectifiers 64 and 65 to cause them to conduct in alternate half-cycles. Interruption of the auxiliary current, and thus interruption of the main current, is caused in synchronism with the switching on of the two silicon controlled rectifiers alternately which are thus switched on at zero current and used only in the fully conducting condition.

If the converter 61 were assumed to have the characteristics of a battery then it will be seen that it would produce a square wave output; however, since the magnitude of the main current depends on the magnitude of the auxiliary current and sinusoidally shaped signals are applied to the auxiliary anode, then each successive half-cycle of main current is also sinusoidal in shape. Control of the wave shape is dependent entirely on the auxiliary discharge current and not at all upon the characteristics of the silicon controlled rectifiers.

We claim:
1. An arrangement for generating alternating current comprising at least one thermionic energy converter having an emitter electrode and a collector electrode between which a main discharge occurs and at least one auxiliary electrode between which and the emitter electrode an auxiliary discharge can occur to control the main discharge, commutation means for repetitively switching the output current of said thermionic energy converter along two circuital paths in alternate succession, means for momentarily interrupting the auxiliary discharge at the same time as operation of said commutation means to cause corresponding momentary interruption of the main discharge, and an A.C. power output circuit coupled to said two circuital paths for energisation alternately in opposite directions by current flow along said two circuital paths alternately.

2. An arrangement for generating alternating current comprising at least one thermionic energy converter having an emitter electrode and a collector electrode between which a main discharge occurs and at least one auxiliary electrode between which and the emitter electrode an auxiliary discharge can occur to control the main discharge, switching means for switching the output current of said thermionic energy converter along either of two circuital paths, an A.C. power output circuit coupled to said two circuital paths for energisation alternately in opposite direction by current flow along said two circuital paths alternately, means energised by signals derived from said output circuit for operating said switching means at the ends of successive half-cycles of the current in said output circuit, and means for momentarily interrupting the auxiliary discharge to cause corresponding momentary interruption of the main discharge at the same time as operation of said switching means.

3. An arrangement for generating alternating current comprising at least one thermionic energy converter having an emitter electrode and a collector electrode between which a main discharge occurs and a pair of auxiliary anodes between either of which and the emitter electrode an auxiliary discharge can occur to control the main discharge, switching means for switching the output current of said thermionic energy converter along either of two circuital paths, an A.C. power output circuit coupled to said two circuital paths for energisation alternately in opposite directions by current flow along said two circuital paths alternately, a control circuit coupled to said power output circuit for energisation by signals derived from said power output circuit, said control circuit being connected to said auxiliary anodes to energise them in anti-phase in successive half-cycles of the current in said output circuit thereby to cause momentary interruption of the auxiliary discharge at the ends of each half-cycle, and means for operating said switching means at the same time as the interruption of the auxiliary discharge to switch the output current from the thermionic energy converter from one circuital path to the other.

4. The arrangement according to claim 3 in which said switching means comprises a mechanical switching device.

5. The arrangement according to claim 4 in which said mechanical switching device comprises a two-way switch having two pairs of switching contacts arranged to be connected together alternatively, each pair of switching contacts comprising conical mating surfaces having cone angles greater than the angle of friction between the surfaces, a contact of each pair being moveable to two alternative switching positions, and impulsive blow generating means for moving the moveable contacts to their two alternative positions in alternate sequence.

6. The arrangement according to claim 3 in which said switching means comprises a pair of solid state switching devices.

7. The arrangement according to claim 6 in which said solid state switching devices comprise gated rectifiers having their emitter and collector electrodes connected in said two circuital paths respectively and in which said means for operating said switching means comprises means for energising the base electrodes of said gated rectifiers in anti-phase.

8. An arrangement for generating alternating current comprising at least one thermionic energy converter having an emitter electrode and a collector electrode between which a main discharge occurs and at least one auxiliary electrode between which and the emitter electrode an auxiliary discharge can occur to control the main discharge, switching means for switching the output current of said thermionic energy converter along either of two circuital paths, an A.C. power output circuit coupled to said two circuital paths for energisation alternately in opposite directions by current flow along said two circuital paths alternately, means energised by signals derived from said output circuit for operating said switching means at the ends of successive half-cycles of the current in said output circuit, and means for obtaining a control signal in the form of an unsmoothed full-wave rectified signal from said output circuit and applying said control signal to control said auxiliary discharge so as to cause momentary interruption of the auxiliary discharge at the ends of successive half-cycles of the current in said output circuit at the same time as operation of said switching means.

9. An arrangement for generating current comprising at least one thermionic energy converter having an emitter electrode and a collector electrode between which a main discharge occurs and at least one auxiliary electrode between which and the emitter electrode an auxiliary discharge can occur to control the main discharge, two different circuital paths for the output current of said thermionic energy converter, solid state switching devices for controlling the current flow along said two circuital paths, an A.C. power output circuit coupled to said two circuital paths for energisation alternately in opposite directions by current flow along said two circuital paths alternately, an oscillatory circuit arranged to supply switching signals in anti-phase to the switching devices in said two circuital paths respectively to cause them to conduct alternately, means for obtaining a control signal in the form of an unsmoothed full-wave rectified signal from said oscillatory circuit and applying said control signal to control said auxiliary discharge so as to cause momentary interruption of the main discharge at the ends of successive half-cycles of the current in said oscillatory circuit, and means for energising said oscillatory circuit from said A.C. power output circuit.

References Cited

UNITED STATES PATENTS

| | | | |
|---|---|---|---|
| 3,089,079 | 5/1963 | Milligan | 322—2 |
| 3,119,059 | 1/1964 | Hall | 322—2 |
| 3,179,873 | 4/1965 | Rosa | 322—2 |
| 3,210,642 | 10/1965 | Rosa | 322—2 |
| 3,225,227 | 12/1965 | Biehl | 322—2 |
| 3,273,048 | 9/1966 | Hoff | 322—2 |

FOREIGN PATENTS 966,130   3/1963   Great Britain.

MILTON O. HIRSHFIELD, *Primary Examiner.*

J. J. SWARTZ, J. W. GIBBS, *Assistant Examiners.*